INVENTOR
W. C. G. ORTEL
BY G. E. Kerry
ATTORNEY

Feb. 27, 1968 W. C. G. ORTEL 3,371,226
PULSE AMPLITUDE DISCRIMINATOR USING
NEGATIVE RESISTANCES DEVICES
Filed Dec. 30, 1964 2 Sheets-Sheet 2

United States Patent Office 3,371,226

Patented Feb. 27, 1968

3,371,226

PULSE AMPLITUDE DISCRIMINATOR USING NEGATIVE RESISTANCE DEVICES

William C. G. Ortel, New York, N.Y., assignor to Bell Telephone Laboratories, Incorporated, New York, N.Y., a corporation of New York Filed Dec. 30, 1964, Ser. No. 422,221
7 Claims. (Cl. 307—235)

ABSTRACT OF THE DISCLOSURE

A pulse amplitude discriminator that uses the negative resistance characteristics of a tunnel diode is disclosed. The bias and load of the tunnel diode are adjusted so that the diode has a stable equilibrium point in the positive resistance region of its characteristic curve and two unstable equilibrium points in the negative resistance region of its characteristic curve. When input signals above a selected amplitude are applied, the diode switches from the stable equilibrium point, through both unstable equilibrium points, to produce output pulses which are all of substantially the same amplitude. When the input signals are below the selected amplitude, there is substantially no output pulse generated by the diode.

This invention relates to the generation of pulse signals and more particularly to the generation of pulse signals by negative resistance devices.

Pulse signals can be generated by "triggering" a negative resistance device which has been biased to have a single equilibrium operating point. When the equilibrium is sufficiently disturbed by an input, the result is an output transition in the form of a pulse.

A well known negative resistance device is the "tunnel" diode. It has a current-voltage characteristic with a region of negative resistance extending between adjoining regions of positive resistance. It is conventionally biased for pulse generation by having a load line which intersects the current-voltage characteristic at a single point in one of the positive resistance regions. When an input is applied which, in effect, carries the load line beyond a threshold into the negative resistance region, a temporary signal transition occurs. Once the threshold is exceeded, the extent of the transition depends upon the magnitude of the input. As the input increases, the magnitude of the output transition increases correspondingly.

However, in many circuits which make use of pulse generators it is desirable to have pulse discrimination, i.e., inputs below a prescribed level should produce no output while those above that level should produce a uniform output. With conventional negative resistance pulse generators it is necessary to apply an input of considerable magnitude before the output will have the desired form; the erroneous application of lesser inputs produces undesired outputs.

Accordingly it is an object of the invention to facilitate the generation of pulse signals. A related object is to achieve the discriminate generation of pulse signals by which inputs below a prescribed level produce no output, while inputs above that level produce a substantially uniform output. A further object is to achieve a substantial output for small amplitude inputs above the discriminate level.

To accomplish the foregoing and related objects the invention provides for biasing a negative resistance device so that it has three equilibrium operating points, one of which is in a first region of positive resistance and is stable, and two of which are in an adjoining region of negative resistance and are unstable.

As a result, a transition initiated by an input of sufficient magnitude to carry the operation from the initial, stable equilibrium operating point to the first unstable equilibrium operating point will, by virtue of the effect of the second unstable equilibrium operating point, be extended into the vicinity of the second region of positive resistance. Thus inputs whose transitions would otherwise be curtailed without reaching the second region of positive resistance will produce appreciably increased outputs of substantially uniform magnitudes.

It is a feature of the invention that a discriminate pulse regenerator can be adapted to the regeneration of multilevel pulse code signals.

Other aspects of the invention will become apparent after considering several illustrative embodiments taken in conjunction with the drawings in which.

Figure 1:
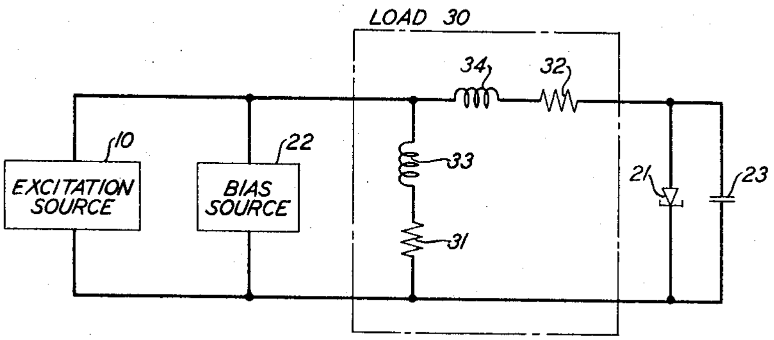
FIG. 1 is a block and schematic diagram of a discriminate pulse regenerator.
Figure 2A:
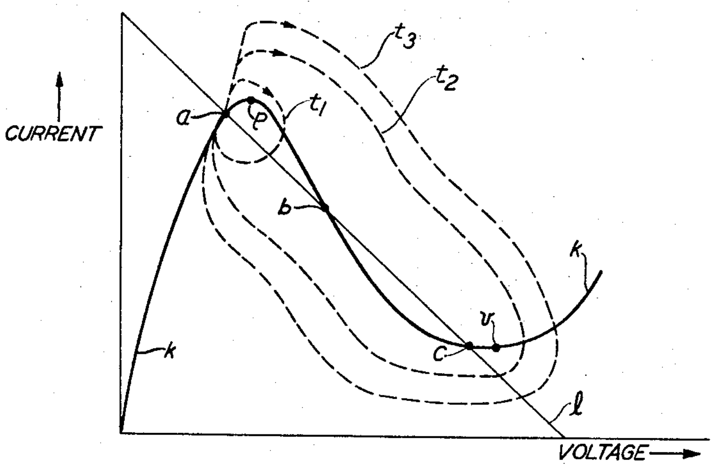
FIG. 2A is a current-voltage diagram applicable to the pulse generator of FIG. 1.

With reference to FIG. 1, a pulse generator in accordance with the invention is activated from an excitation source 10. The pulse generator includes a negative resistance diode 21 whose current-voltage characteristic $k$, as shown in FIG. 2A, has a negative resistance region between adjoining regions of positive resistance. The negative resistance region extends from a peak point $p$ to a valley point $v$ of the characteristic $k$. Accompanying the diode 21 is a capacitor 23 which can represent the inherent capacitance of the diode. The operating points of the diode 21, by which discriminate pulse generation is achieved, are established by a bias source 22 acting in concert with a load 30. Included in the load are two resistance elements 31 and 32 and two inductors 33 and 34. The first resistance element 31 represents the external load of the pulse generator and is accompanied by an inductor 33 which can represent stray inductance effects. The second resistance element 32 and the second inductor 34 can represent the stray resistance and inductance effects of the diode 21. The bias source 22 produces a constant current output which is realized either from a conventional constant current generator or a voltage source in series with a resistor of appreciable resistive magnitude.

The load line $l$ presented to the current-voltage characteristic of the diode in FIG. 2A is linear. It has a slope given by the sum of the resistive magnitudes of the two resistive elements 31 and 32. The intercept point on the current axes of the characteristic is given by Equation 1:

$$\frac{I_1 R_1}{R_1+R_2} \qquad (1)$$

where $I_1$ is output current of the bias source 22,
$R_1$ is the resistive magnitude of resistor 31, and
$R_2$ is the resistive magnitude of resistor 32.

In order for the pulse generator of FIG. 1 to have the desired discriminate effect, the load line $l$ must intersect the characteristic $k$ at three equilibrium points $a$, $b$, and $c$. To achieve this condition the incremental load resistance must be greater than the magnitude of the negative resistance of the diode at point $b$. The desired equilibrium conditions may also be realized using a nonlinear load.

Other desirable conditions on the resistance, inductance and capacitance parameters of the pulse generator are summarized by Equations $2a$ and $2b$ which respectively give the conditions at equilibrium points $a$ and $c$ of the characteristic $k$:

$$R_a/L+1/Cr_a>0 \quad (2a)$$

$$R_c/L+1/Cr_c<0 \quad (2b)$$

where $R_a$ is the incremental resistance of the load 30 at point $a$ of the characteristic $k$, L is the total series inductance presented by inductors 33 and 34, C is the capacitance of capacitor 23, $r_a$ is the resistance of the characteristic $k$ at point $a$, $R_c$ is the incremental resistance of the load 30 at point $c$, and $r_c$ is the resistance of the characteristic $k$ at point $c$.

By virtue of the way in which the unstable equilibrium operating points $b$ and $c$ have been selected, an input applied to the pulse generator of FIG. 1 from the excitation source 10 either produces a momentary excursion into the negative resistance region, with a rapid return to the stable equilibrium operating point $a$, or an excursion which carries beyond point $c$. Illustrative excursions are represented by dashed-line curves $t_1$, $t_2$ and $t_3$ in FIG. 2A.

In the steady state, the current passing through the branch of the pulse generator containing the resistor 32 is established by the characteristic $k$ of FIG. 2A. For the position of the load line $l$ shown in FIG. 2A the current is fixed by the equilibrium operating point $a$. Once the equilibrium has been disturbed, the current is no longer restricted to the characteristic, but instead follows a trajectory in the current-voltage plane. The first trajectory $t_1$ shown in FIG. 2A results from an input which is somewhat below the discriminate amplitude of the generator; while the trajectory $t_2$ results from an input somewhat above the discriminate level. The third trajectory $t_3$ is for an input of substantial magnitude. The output for the first trajectory $t_1$ is negligible; by contrast, the outputs for the second and third trajectories $t_2$ and $t_3$ are substantially the same. These outputs exhibit abrupt and rapid transitions where the trajectories are in the negative resistance region of the characteristic $k$, and slower transitions where the trajectories carry into positive resistance regions. The results for trajectories $t_2$ and $t_3$ are output voltage pulses of desired waveform.

To prevent retriggering of the diode upon the return excursions of the trajectories the resistance, inductance and capacitance parameters of the diode 21 desirably satisfy Equation 3:

$$[R_a/L+(1/Cr_a)]^2>(4/LC)[1+R_a/r_a] \quad (3)$$

where the symbols are as defined for Equations 2$a$ and 2$b$.

Figure 2B:
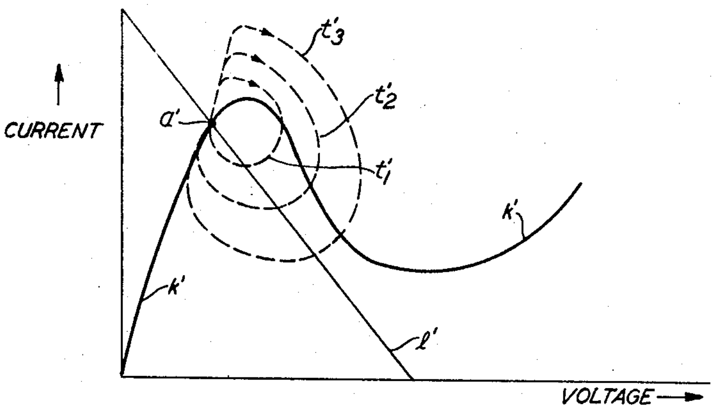
FIG. 2B is a current-voltage diagram applicable to a conventional pulse generator.

The operating trajectories discussed in conjunction with FIG. 2A are in marked contrast with similar operating trajectories for a negative resistance pulse generator which is biased for monostable operation in conventional fashion. The resulting trajectories $t_1'$, $t_2'$, and $t_3'$ are given in FIG. 2B. Only for large amplitude inputs will the outputs be relatively independent of input magnitude. For inputs of smaller magnitude there is a direct relationship between the magnitude of the input and that of the output.

Figure 3:
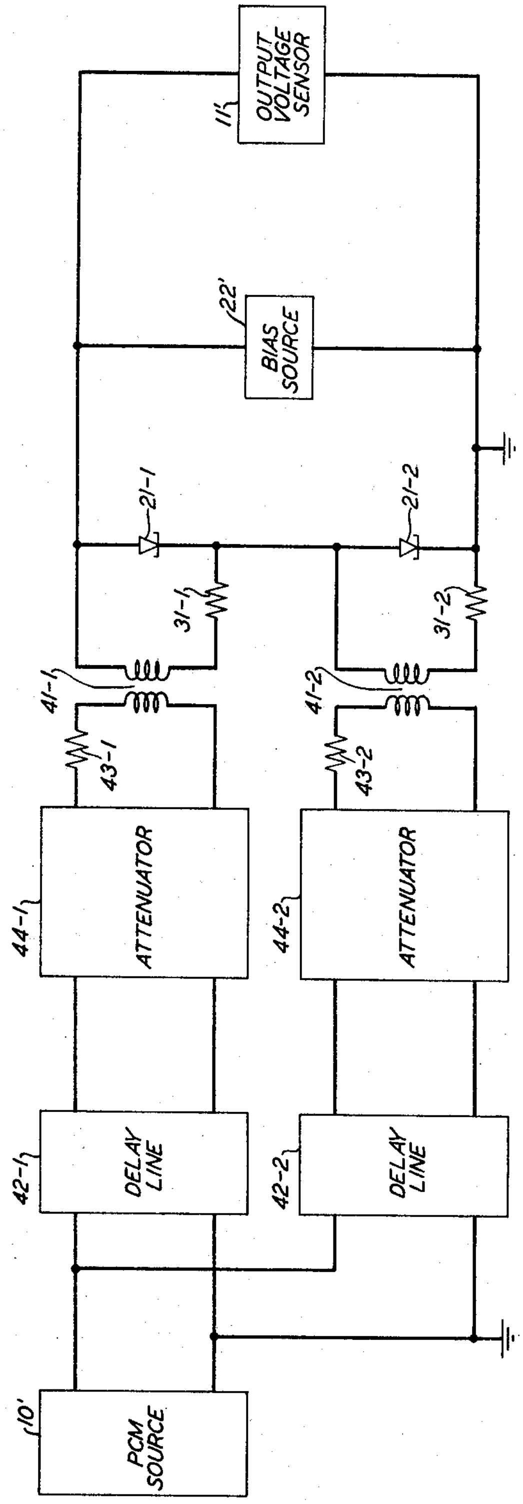
FIG. 3 is a circuit diagram of a multilevel pulse code regenerator employing pulse generators of the kind shown in FIG. 1.

The pulse generator of FIG. 1 is readily adapted to the regeneration of multilevel pulse signals. Such an adaptation is given in FIG. 3 for inputs having either of two non-zero levels.

In a tested model of the invention, the diode 21 took the form of a germanium tunnel diode, bearing the designation TD103 of the General Electric Company and having a specified capacitance of 2.5 micromicrofarads for capacitor 23. Resistors 31 and 32 had respective resistance values of 3.9 ohms and 6.7 ohms; while inductors 33 and 34 represented stray inductances of 2.25 nanohenries and 4.0 nanohenries. For this model, a triggering input as low as 2 milliamperes produced an output pulse of about 160 millivolts over a pulse interval of approximately 0.3 nanoseconds.

The inputs from a source 10' are coupled to diodes 21–1 and 21–2 through transformers 41–1 and 41–2 by way of delay lines 42–1 and 42–2. For convenience the lines 42–1 and 42–2 have identical delay characteristics and are terminated for no reflection by resistors 43–1 and 43–2. Interpositioned between terminating resistors 43–1 and 43–2 and the delay lines 42–1 and 42–2 are respective attenuating networks 44–1 and 44–2. The attenuating networks are adjusted to control the discriminate levels of the diodes 21–1 and 21–2. If, for example, the input pulses have levels of 2 or 4 milliamperes, both diodes 21–1 and 21–2 are loaded to respond at the 2 milliampere level. The first attenuating network 44–1 is set to reduce the input supplied to it by one-half so that the diode 21–1 associated with it will not respond to a 2 milliampere input, but will respond to a 4 milliampere input. The second attenuating network 44–2 is set for zero attenuation so that its associated diode 21–2 responds to either the 4 milliampere or 2 milliampere level. Thus a 2 milliampere input produces a single output while a 4 milliampere input, by virtue of the responses of the diodes, produces a double output as desired.

Bias for the diodes is applied in the form of a timing wave from a source 22'. The timing wave is generated as a conventional train of pulse signals to coincide with the arrival of inputs at the diodes. The operating points of the diodes are established as for the pulse generator of FIG. 1 taking into account the resistance of the loading resistors 31–1 and 31–2 and the resistance manifested at the diodes from the input and the output. Once a diode has been triggered, an output of appreciable magnitude is sensed by an output voltage sensor 11'. During the interval that follows triggering and before the arrival of a new input, bias is removed and the timing is a zero level. This prevents the change in state of a triggered diode from spuriously triggering one of the other diodes through its associated delay line.

Other adaptations and modifications of the invention will occur to those skilled in the art.

What is claimed is:

1. A pulse generator comprising a negative resistance diode characterized by a first region of positive resistance and a region of negative resistance extending from said first region of positive resistance to a second region of positive resistance, load means characterized by a load line having a slope of $$\frac{-1}{R_1+R_2}$$

where $R_1$ is the external load resistance and $R_2$ is the stray resistance of said diode, and biasing means for positioning said load line with respect to the current-voltage characteristic of said diode to intersect the current axis of the diode characteristic at the point $$\frac{I_1R_1}{R_1+R_2}$$

where $I_1$ is the bias source current, and intersect said characteristic curve in the region of negative resistance at two points, one of which is characterized by the sum of $R_1+R_2$ being less than the negative resistance of said diode at that point.

2. Apparatus comprising a negative resistance device characterized by a positive resistance region, a negative resistance region, and capacitance effects, load means characterized by resistance and inductance effects, means for energizing said negative resistance device and said load means to establish (1) a stable equilibrium operating point for said negative resistance device in said positive resistance region and (2) an unstable equilibrium operating point in said negative resistance region where said resistance, inductance, and capacitance effects of said negative resistance device and said load means satisfy the following relationships:

$$R_a/L+1/Cr_a>0$$
$$R_c/L+1/Cr_c<0$$

where $R_a$ is the incremental resistance of said load means at said stable equilibrium operating point,
L is the inductance of said load means,
C is the capacitance of said negative resistance device,
$r_a$ is the resistance of said negative resistance device at said stable equilibrium operating point,
$R_c$ is the incremental resistance of said load means at said unstable equilibrium operating point, and
$r_c$ is the resistance of said negative resistance device at said unstable equilibrium operating point.

3. Apparatus as defined in claim 2 wherein said resistance, inductance, and capacitance effects of said negative resistance device and said load means further satisfy the following relationship:

$$\left[\frac{R_a}{L}+\left(\frac{1}{Cr_a}\right)\right]^2>\left(\frac{4}{LC}\right)\left[1+\frac{R_a}{r_a}\right]$$

where $R_a$, L, C and $r_a$ are as defined in claim 2.

4. Apparatus for regenerating input signals, each of which has an amplitude level representing one of a set of different amplitude levels, comprising:
a plurality of negative resistance devices,
means for biasing said negative resistance devices to have three equilibrium operating points, one of which is stable and two of which are unstable,
means for triggering one of said devices from its stable equilibrium operating point in response to input signals whose amplitude levels exceed a prescribed one of said set of different amplitude levels,
and means for triggering another of said devices from its stable equilibrium operating point in response to input signals whose amplitude levels exceed another prescribed one of said set of different amplitude levels.

5. Apparatus as defined in claim 4 further including means for preventing the triggering of one of said negative resistance devices from triggering another of said devices.

6. Apparatus for regenerating multilevel pulse signals which comprises:
a plurality of paths to which a variable amplitude signal is applied,
means included in each path for attenuating signals of one amplitude level to a prescribed amplitude level, said one level being different for each path,
a plurality of negative resistance diodes connected in series,
means for loading and biasing said diodes to be triggered in response to signals of said prescribed amplitude level,
and means for coupling the outputs of said paths to different ones of said diodes.

7. A multilevel pulse signal regenerator which comprises:
a plurality of negative resistance diodes connected in series,
a plurality of transformers, one coupled to each of said diodes,
a plurality of attenuating networks, one connected to each of said transformers,
an input,
a plurality of delay lines, each interconnecting one of the attenuating networks with said input,
and bias means for energizing said diodes during discrete and successive input intervals.

References Cited

UNITED STATES PATENTS

| | | | |
|---|---|---|---|
| 3,027,464 | 3/1962 | Kosonocky | 307—88.5 |
| 3,069,564 | 12/1962 | De Lange | 307—88.5 |
| 3,108,229 | 10/1963 | Herzog | 307—88.5 X |
| 3,119,937 | 1/1964 | Bergman | 307—88.5 |
| 3,121,176 | 2/1964 | Burns et al. | 307—88.5 |
| 3,209,170 | 9/1965 | Cooperman | 307—88.5 |

ARTHUR GAUSS, *Primary Examiner.*

DONALD D. FORRER, *Assistant Examiner.*